(12) United States Patent
Guasco

(10) Patent No.: US 8,186,071 B2
(45) Date of Patent: May 29, 2012

(54) CO-ORDINATE MEASURING MACHINE WITH A DEVICE FOR BALANCING THE WEIGHT OF A VERTICALLY MOBILE MEMBER

(75) Inventor: Giampiero Guasco, Rivalta di Torino (IT)

(73) Assignee: Hexagon Metrology S.p.A., Moncalieri (IT)

( * ) Notice: Subject to any disclaimer, the term of this patent is extended or adjusted under 35 U.S.C. 154(b) by 411 days.

(21) Appl. No.: 12/519,164

(22) PCT Filed: Dec. 14, 2007

(86) PCT No.: PCT/IB2007/003915
§ 371 (c)(1),
(2), (4) Date: Oct. 22, 2009

(87) PCT Pub. No.: WO2008/075170
PCT Pub. Date: Jun. 26, 2008

(65) Prior Publication Data
US 2010/0083517 A1    Apr. 8, 2010

(30) Foreign Application Priority Data

Dec. 15, 2006  (IT) .............................. TO2006A0891

(51) Int. Cl.
*G01B 5/008*    (2006.01)

(52) U.S. Cl. ......................................................... 33/503
(58) Field of Classification Search .................... 33/503
See application file for complete search history.

(56) References Cited

U.S. PATENT DOCUMENTS

| 4,155,173 | A |   | 5/1979  | Sprandel |
|-----------|---|---|---------|----------|
| 4,296,474 | A | * | 10/1981 | Hurt ................................. 33/503 |
| 4,805,314 | A | * | 2/1989  | Hayashi et al. ................. 33/503 |
| 5,291,662 | A | * | 3/1994  | Matsumiya et al. ............. 33/503 |
| 2004/0250434 | A1 | * | 12/2004 | Ogura et al. .................... 33/503 |
| 2010/0082289 | A1 | * | 4/2010  | Staaden .......................... 33/503 |
| 2012/0017453 | A1 | * | 1/2012  | Ogihara et al. ................. 33/503 |

FOREIGN PATENT DOCUMENTS

| EP | 0 322 740 A | 7/1989 |
| JP | 60 152910 A | 8/1985 |
| WO | WO 88/03257 | 5/1988 |

* cited by examiner

*Primary Examiner* — G. Bradley Bennett
(74) *Attorney, Agent, or Firm* — Leason Ellis LLP

(57) ABSTRACT

A measuring machine comprising a measuring column, which can move vertically with respect to a carriage, and a device for balancing the weight of the column, which is provided with a pneumatic cylinder having its liner fixed to the column and the stem constrained to a supporting structure, carried by the carriage via an elastic-suspension assembly that enables the stem to follow the liner in the case of adhesion and to return into a position of equilibrium when the elastic reaction of the elastic-suspension assembly overcomes the force of friction between the piston and the liner; stick-slip phenomena are thus neutralized.

16 Claims, 3 Drawing Sheets

CO-ORDINATE MEASURING MACHINE WITH A DEVICE FOR BALANCING THE WEIGHT OF A VERTICALLY MOBILE MEMBER

TECHNICAL FIELD

The present invention relates to a co-ordinate measuring machine provided with a device for balancing the weight of a vertically mobile member.

The present invention finds particularly advantageous, albeit not exclusive, application in co-ordinate measuring machines of large dimensions of the gantry type, to which reference will be made by way of example in what follows, for greater clarity, without on the other hand this implying any loss of generality.

BACKGROUND ART

Gantry measuring machines are known that comprise a pair of lateral supporting structures, each constituted by a plurality of vertical pillars aligned with respect to one another and by a top horizontal fixed beam supported by the pillars. The fixed beams of the two supporting structures are set parallel to one another and to a first co-ordinate axis of the machine. The machine moreover comprises a horizontal mobile beam set transverse to the fixed beams, and supported by the latter, which can slide in the direction of the first axis along guides provided on the fixed beams. The mobile beam in turn comprises a plurality of guides along its longitudinal axis, that is orthogonal to the first axis and constitutes a second axis of the machine. A carriage, carried by the mobile beam, is movable on the guides of the beam along the second axis. Finally, a column measuring head is carried by the carriage and is movable with respect to the latter vertically along a third axis of the machine. The measuring head is designed to be equipped, at its bottom end, with a detecting device of the contact or remote type.

In measuring machines of the type described, the weight of the mobile members, albeit contained as much as possible, is even so considerable.

As regards the measuring head, which is vertically mobile, it is expedient for the weight to be balanced so as not to load the electric motor driving the head; otherwise, said motor would have to be oversized. In addition, should the weight of the driving head not be balanced, it would be necessary to provide alternative systems for operator safety that can be activated in the case of failure of the motor.

Devices are known for balancing the weight of the measuring head that substantially consist of a single-acting pneumatic cylinder comprising a liner and a piston, which can slide in a fluid-tight way in the liner. The measuring head is fixed with respect to one of the members of the cylinder, for example the liner, whilst the other member, for example the stem, is rigidly connected to a head supporting structure carried by the carriage. By supplying compressed air into the cylinder, it is possible to balance the weight of the measuring head via the pressure force. The head is consequently floating in a vertical direction and subject to the driving forces substantially as if it were weightless.

A drawback linked to known balancing devices is represented by the friction that is generated at the sealing between the piston and the liner, said sealing being generally constituted by a seal housed in a peripheral seat of the piston and sliding within the liner.

On account of the friction, when the head is actuated and therefore the piston slides within the liner, the seal tends to adhere to the liner, and motion unsteadiness phenomena of the type known as "stick-slip" occur, which are problematical as regards the head position control, particularly in the continuous surface scanning operating mode.

The above problems could be solved or attenuated by using high precision cylinders having no seals. However, cylinders of the aforesaid type and of sufficient length for the application are extremely costly and difficult to find on the market.

DISCLOSURE OF INVENTION

The aim of the present invention is to produce a measuring machine that is free from the drawbacks linked to the known art and specified above.

The aforesaid aim is achieved by a measuring machine according to Claim 1.

BRIEF DESCRIPTION OF THE DRAWINGS

For a better understanding of the present invention, described hereinafter is a preferred embodiment, provided purely by way of non-limiting example and with reference to the attached drawings, wherein.

BEST MODE FOR CARRYING OUT THE INVENTION

Figure 1:
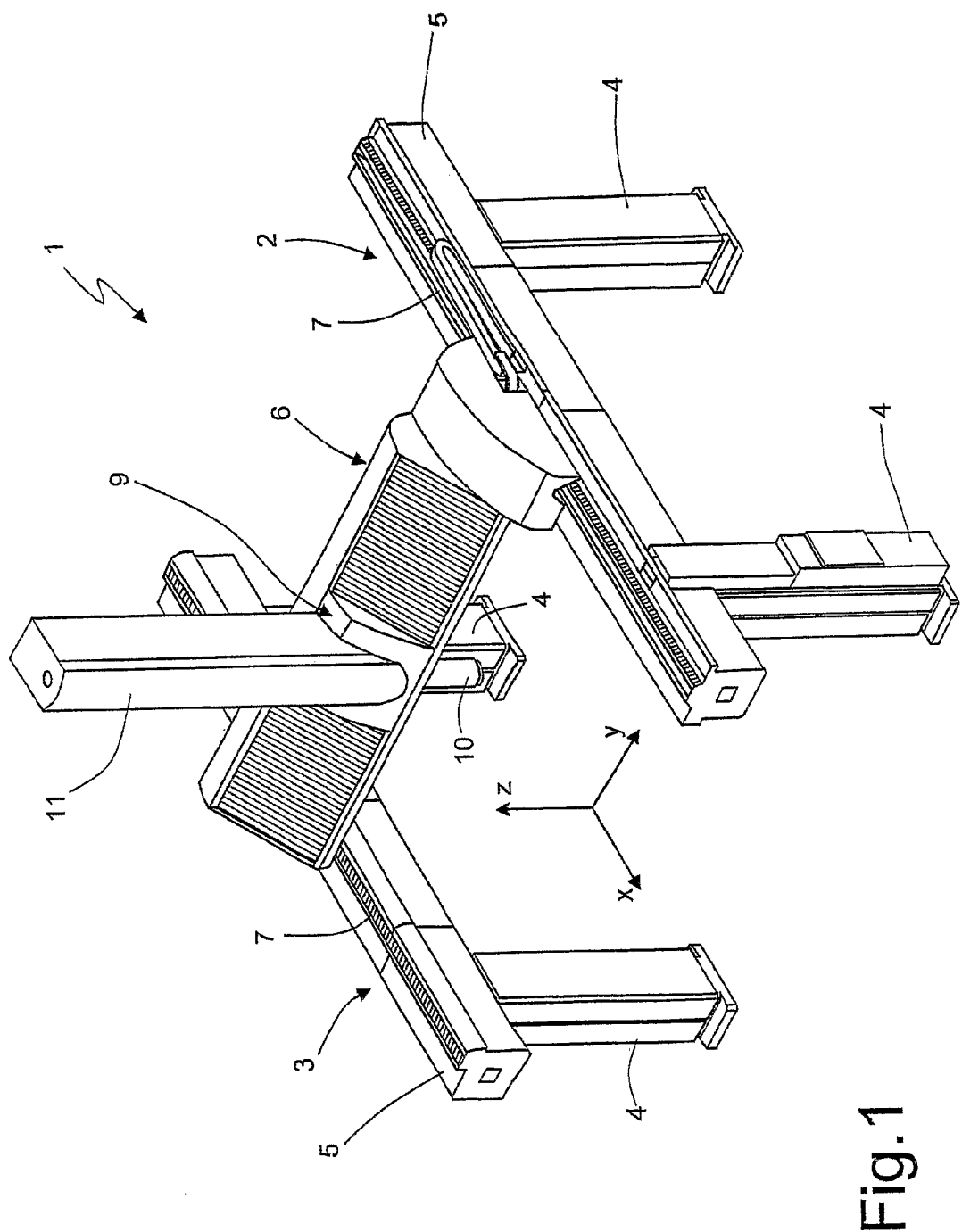
FIG. 1 is a schematic perspective view of a measuring machine provided with a weight balancing device according to the present invention.
Figure 2:
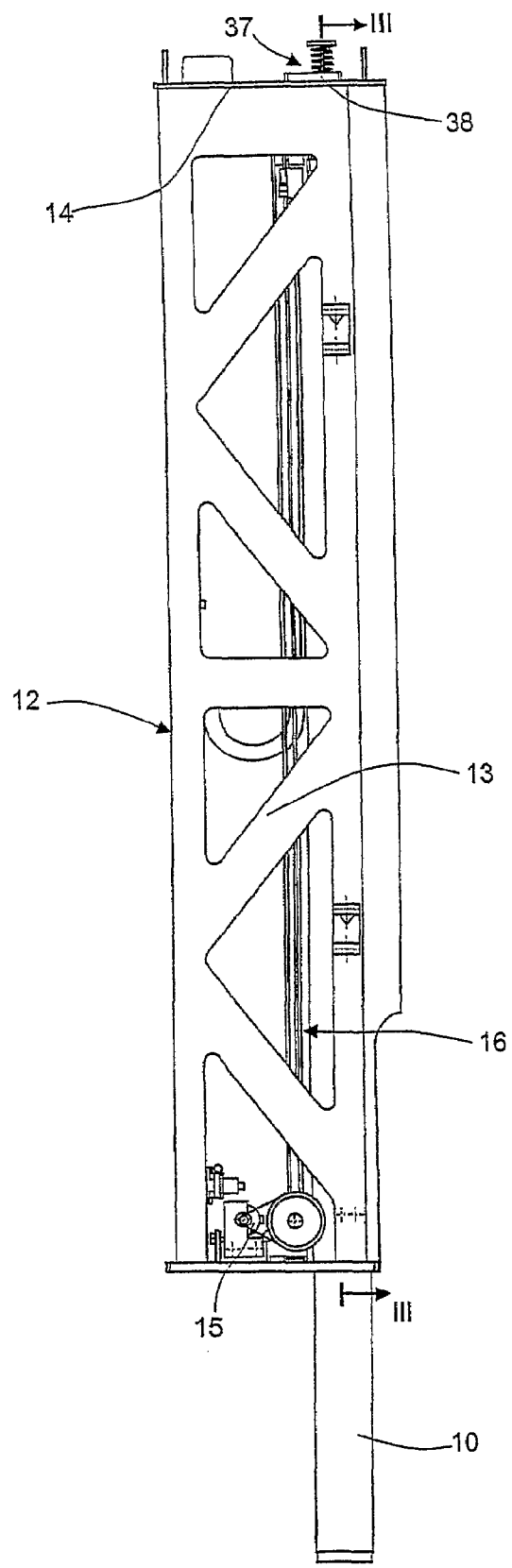
FIG. 2 is an enlarged scale side elevation view of a measuring head of the machine of FIG. 1.

With reference to FIG. 1, designated by 1 is a gantry measuring machine comprising a pair of lateral supporting structures 2, 3, each constituted by a plurality of vertical pillars 4 aligned to one another (in the example illustrated, just two) and by a top horizontal fixed beam 5, supported by the pillars 4. The fixed beams 5 of the two supporting structures 2, 3 are set parallel to one another and to a first co-ordinate axis X of the machine 1. The machine 1 moreover comprises a horizontal cross member 6 set transverse to the fixed beams 5, which is supported by the latter and can slide in the direction of the first axis X on guides 7 provided on the fixed beams 5. The cross member 6 in turn defines a plurality of guides (not visible in FIG. 2) parallel to its longitudinal axis, orthogonal to the first axis and constituting a second axis Y of the machine.

A carriage 9, carried by the cross member 6, is movable along the aforesaid guide along the second axis Y. Finally, a column measuring head 10 (hereinafter "the column 10") is carried by the carriage 9 and can move with respect to the latter vertically along a third axis Z of the machine. The column 10 is designed to be equipped, at its bottom end, with a contact or remote detecting device (not illustrated either).

The column 10 has a tubular structure with a vertical axis and is guided to move vertically by guides (not illustrated), carried by the carriage 9.

Set on the carriage 9 is a box-shaped supporting structure 11, which houses the column part 10 extending on top of the carriage 9. The structure 11 comprises a lattice frame 12 (FIG. 2), delimited at the top by a wall 14. The column is driven by an electric motor 15 carried by the frame 12 via a belt transmission 16, in a conventional way.

Figure 3:
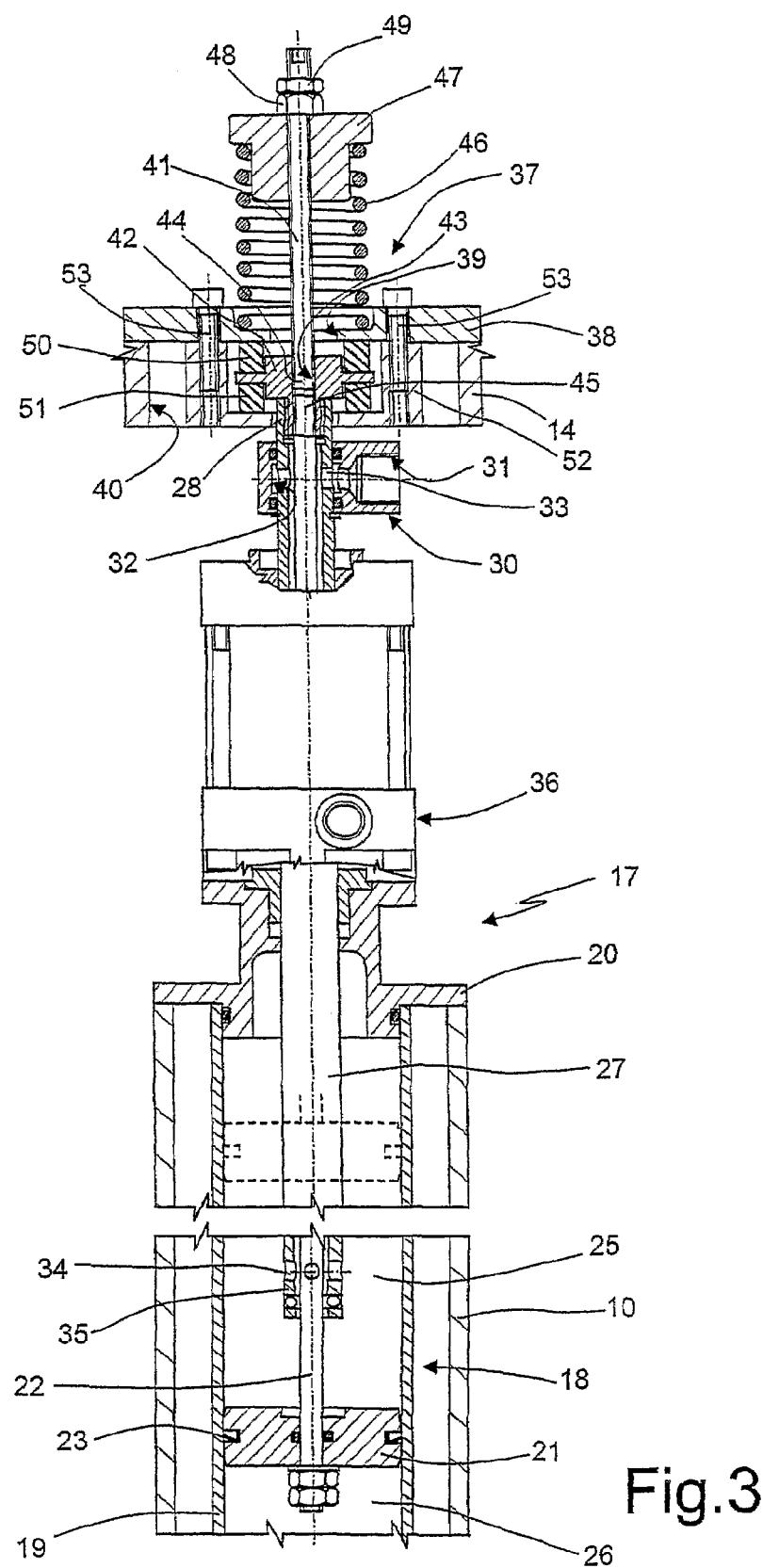
FIG. 3 is a cross section taken along the line of FIG. 2, at a further enlarged scale.

The column 10 (FIGS. 2 and 3) is constrained to the top wall 14 of the frame 12 via a device 17 for balancing the weight of the column 10.

The device 17 (FIG. 3) comprises a pneumatic cylinder 18 having a liner 19 with vertical axis, rigidly fixed to the column 10 and housed inside the column 10; the column 10 and the liner 19 are closed at the top by a common head 20. The pneumatic cylinder 13 moreover comprises a piston 21, which can slide in a fluid-tight way in the liner 19, and a stem 22, which is fixed with respect to the piston.

The piston 21, provided with a peripheral seal 23, which co-operates in a fluid-tight way with the internal surface of the liner 19, divides the internal volume of the liner 19 into a top chamber 25 and a bottom chamber 26.

The stem 22 is housed with radial play within a tube 27 passing through the head 20 in a fluid-tight way, and having the purpose of connecting the top chamber 25 of the cylinder to a pneumatic circuit (not illustrated). For this purpose, an annular connector 30 is fixed in a fluid-tight way around the tube 27 in the proximity of the top end 28 of the latter, and has a threaded radial hole 31 for attachment to the pneumatic circuit. The hole 31 communicates with the inside of the tube through an annular groove 32 of the connector 30 and a plurality of radial holes 33 of the tube 27. Similar radial holes 34 are made at a bottom end 35 of the tube 27, in the proximity of the piston 21. Said holes form a fluid connection of the chamber 25 with the inside of the tube 27 and consequently with the connector 30.

The stem 22 and the tube 27, on which an emergency brake 36, carried by the column 10 (not described in detail in so far as it does not form part of the invention) can act, are rigidly constrained to one another and are elastically suspended from the top wall 14 of the frame 12 via an elastic-suspension assembly 37 forming part of the device 17.

The elastic-suspension assembly 37 comprises in particular an anchorage plate 38 adjustably fixed to the wall 14 of the frame 12 for centering the column 10 in the plane X-Y and functionally forming part of the frame itself.

The plate 38 has a through hole 39 set in a position corresponding to an opening 40 of the wall 14, and set passing through which is a tie-rod 41 coaxial to the stem 22 and rigidly connected thereto.

The tie-rod 41 is connected to the stem 22, so as to constitute a prolongation thereof upwards, by means of a coupling flange 42 provided with a threaded central through hole 43, in which a bottom end 44 of the stem 41 and a top end 45 of the stem 22 are screwed. Alternatively, the tie-rod 41 could be made of a single piece with the stem 22, i.e., be constituted by a top end portion of the stem 22 passing through the flange 42.

A helical spring 46, externally coaxial to the tie-rod 41, is comprised axially between the plate 38 and a top arrest flange 47 clamped in an adjustable position on the tie-rod 41 via a nut 48 and a lock-nut 49.

The weight of the column 10 is consequently discharged on the frame 12 through the stem 22, the flange 43, and the spring 42.

The suspension assembly 37 moreover comprises a pair of damping rings 50, 51, which are set on opposite faces of the flange 42 and are mounted with an appropriate degree of pre-compression between the latter and, respectively, the plate 38 and a fork-shaped flange 52, housed in the opening 40 of the wall 14 and fixed underneath the plate 38 via screws 53.

The rings 50, 51 are conveniently made of a visco-elastic polymer with a high degree of damping, preferably a polyester-based polyurethane material, for example a Sorbothane° (registered trademark of Sorbothane, Inc., Kent, Ohio, USA).

According to a preferred embodiment, the damping rings 50, 51 are made of Sorbothane® 30 (having a Shore 00 hardness of 30) and are mounted with an axial deformation of pre-compression of 8-11%, preferably approximately 10%.

Operation of the device 17 is described in what follows.

The displacement of the column 10 along the axis Z is controlled in a conventional way by the electric motor 15 via the belt transmission 16.

The column 10 moves in a vertically floating way in so far as its weight is balanced by the pressure of the air in the chamber 25 of the cylinder 18. It is to be noted that the pressure forces in the cylinder 18 are internal to the system so that the weight of the suspended masses (the column 10, the cylinder 18, the brake 36, etc.) continues to weigh down on the spring 46, even though it is uninfluential for the purposes of actuation.

Vertical translation of the column 10 leads to a relative axial displacement between the liner 19 of the cylinder 18, rigidly connected to the column 10, and the piston 21, which, via the stem 22 and the suspension device 37, is constrained to the frame 12.

Upon starting, on account of the static friction between the seal 23 of the piston 21 and the internal surface of the liner 19, temporary adhesion phenomena (stick-slip) may occur. In this case, the piston 21 is drawn along by the liner 19 and moves rigidly therewith. The stem 22, moving with the piston 21, hence brings about a deformation of the spring 46 (a compression increase or partial release, according to whether the motion is downward or, respectively, upward) and hence a variation of the elastic load of the spring. When the load variation of the spring 46 consequent upon said deformation overcomes the friction adhesion force between the seal 23 of the piston 21 and the cam 19, adhesion ceases, and the stem 22 and the piston 21 return to the initial position defined by the equilibrium between the force of the spring 46 and the weight of the suspended masses.

Because of the damping rings 50, 51, detachment of the seal 23 does not lead to oscillatory phenomena and hence does not induce any perturbation on the position of the column 10.

The use of a device 17 according to the present invention enables the machine to be rendered insensible to the dimensional variations of the cylinder, ensuring constant performance along the axis and limiting the stick-slip effects, particularly in the continuous surface scanning operating mode.

Thanks to said device, it is possible to avoid the use of precision cylinders and thus reduce the cost of the machine.

Finally, it is clear that modifications and variations can be made to the device 17 described herein, without departing from the scope of protection of the claims.

In particular, the damping rings 50, 51 can be omitted in the case where the oscillatory phenomena are of a smaller amount or in any case acceptable, or else be replaced by damping means of different nature, for example of a viscous type.

The cylinder 18 could have the liner 19 suspended elastically from the frame 12 and the stem 22 rigidly fixed to the column 10.

The spring 46 could be replaced by elastic means of another type, for example fluid-type elastic means such as an air spring, or elastic means made of elastomeric material.

The spring 46 and the damping rings 50, 51 could be integrated in a single element having both functions.

The invention claimed is:

1. A measuring machine comprising a supporting structure (11), a mobile member (10), which is movable vertically with respect to said supporting structure (11), and a device (17) for balancing the weight of said mobile member comprising a pneumatic cylinder (18) having a first element (19) fixed to said mobile member (10) and a second element (22) constrained to said supporting structure (11), and means (30, 27) for supplying compressed air to said pneumatic cylinder (18) for generating a pressure force between said first element (19) and said second element (22) for balancing the weight at least of said mobile member (10), said measuring machine being characterized in that said second element (22) is connected to said supporting structure (11) via an elastic-suspension assembly (37).

2. The measuring machine according to claim 1, characterized in that said elastic-suspension assembly (37) comprises elastic means (46) set between said second element (22) and said supporting structure (11) so as to discharge the weight of said mobile member (10) onto said supporting structure.

3. The measuring machine according to claim 1, characterized in that said elastic means comprise a helical spring (46) coaxial to said second element (22) of said cylinder (18).

4. The measuring machine according to claim 3, characterized in that said spring (46) is axially set between a stop member (47) axially fixed with respect to said second element (22) and said supporting structure (11).

5. The measuring machine according to claim 1, characterized in that said cylinder (18) comprises a liner (19), a piston (21) slidable in a fluid-tight way in said liner (19), and a stem (22) movable together with said piston (21), said first element of said cylinder (18) being constituted by said liner (19), and said second element of said cylinder (18) being constituted by said stem (22).

6. The measuring machine according to claim 1, characterized by comprising damping means (50, 51) set between said second element (22) and said supporting structure (11) and acting in parallel with said elastic means (46).

7. The measuring machine according to claim 6, characterized in that said damping means (50, 51) act bidirectionally.

8. The measuring machine according to claim 6, characterized in that said damping means (50, 51) comprise at least one element made of high damping polymeric material.

9. The measuring machine according to claim 8, characterized in that said polymeric material has visco-elastic properties.

10. The measuring machine according to claim 9, characterized in that said material is a polyester-based polyurethane material.

11. The measuring machine according to claim 7, characterized in that said element made of polymeric material is mounted pre-compressed.

12. The measuring machine according to claim 8, characterized in that said damping means comprise a pair of rings (50, 51) made of polymeric material, coaxial to said cylinder (18) and mounted between a flange (42) rigidly fixed to said second element (22) and respective walls (38, 52), fixed to said supporting structure (11).

13. The measuring machine according to claim 1, characterized in that said mobile member of said machine (1) is a column (10) that is movable along a vertical axis thereof, and in that said supporting structure (11) comprises a frame (12) fixed to a carriage (9) which is movable along a horizontal axis.

14. The measuring machine according to claim 13, characterized in that said supporting structure comprises a plate (38) fixed in an adjustable way to said frame (12), said axial stop member being constituted by a flange (47) rigidly fixed to the stem (22) of said cylinder (18), said spring (46) being axially set between said flange (47) and said plate (38).

15. The measuring machine according to claim 5, characterized in that said air-supply means comprise a tube (27) externally coaxial to said stem (22) and rigidly connected thereto, said tube (27) being provided with passages for connection of a chamber (25) of said cylinder to an external air circuit.

16. The measuring machine according to claim 4, characterized in that said mobile member of said machine (1) is a column (10) that is movable along a vertical axis thereof, and in that said supporting structure (11) comprises a frame (12) fixed to a carriage (9) which is movable along a horizontal axis.

\* \* \* \* \*